(12) United States Patent
Watson et al.

(10) Patent No.: US 11,271,798 B2
(45) Date of Patent: Mar. 8, 2022

(54) AUTOMATED NETWORK LINK REPAIR

(71) Applicant: salesforce.com, inc., San Francisco, CA (US)

(72) Inventors: Eileen Tschetter Watson, Falls Church, VA (US); Michael Lacey, Dublin (IE); Francis Luong, Reston, VA (US); Craig Stephen Estep, Herndon, VA (US); Peter Sandford White, Ashburn, VA (US); Liam Dowling, Dublin (IE)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/159,957

(22) Filed: Jan. 27, 2021

(65) Prior Publication Data
US 2021/0409262 A1    Dec. 30, 2021

Related U.S. Application Data

(60) Provisional application No. 63/044,271, filed on Jun. 25, 2020.

(51) Int. Cl.
| G06F 15/177 | (2006.01) |
| H04L 41/0654 | (2022.01) |
| H04L 41/0816 | (2022.01) |
| H04L 41/0681 | (2022.01) |
| G06F 15/173 | (2006.01) |

(52) U.S. Cl.
CPC ...... *H04L 41/0654* (2013.01); *H04L 41/0681* (2013.01); *H04L 41/0816* (2013.01)

(58) Field of Classification Search
CPC ............ H04L 41/0654; H04L 41/0681; H04L 41/0816
USPC .......................................... 709/224
See application file for complete search history.

(56) References Cited

U.S. PATENT DOCUMENTS

| 7,864,706 | B1* | 1/2011 | Zinjuwadia | H04L 45/04 370/254 |
| 9,425,893 | B1* | 8/2016 | Srinivasan | H04Q 11/0005 |
| 2003/0202476 | A1* | 10/2003 | Billhartz | H04L 45/302 370/236 |
| 2008/0253314 | A1* | 10/2008 | Stephenson | H04B 17/26 370/326 |
| 2012/0124414 | A1* | 5/2012 | Dallas | H04L 67/1097 714/6.2 |
| 2018/0006925 | A1* | 1/2018 | Boh | H04L 41/0645 |
| 2019/0182119 | A1* | 6/2019 | Ratkovic | H04L 43/045 |

* cited by examiner

*Primary Examiner* — Karen C Tang
(74) *Attorney, Agent, or Firm* — Holland & Hart LLP

(57) ABSTRACT

A system may identify, by a first service, one or more faulted data links associated with a network device of the datacenter and update, by a second service, a configuration of the network device to remove data traffic from the identified one or more faulted data links based on a redundancy threshold associated with the network device. The system may also generate a repair ticket message associated with the identified one or more faulted data links and transmit test traffic across the identified one or more faulted data links while monitoring for a repair ticket resolution message associated with repairing the identified one or more faulted data links.

20 Claims, 12 Drawing Sheets

AUTOMATED NETWORK LINK REPAIR

CROSS REFERENCES

The present Application for Patent claims the benefit of U.S. Provisional Patent Application No. 63/044,271 by EILEEN WATSON, et al., entitled "AUTOMATED NETWORK LINK REPAIR," filed Jun. 25, 2020, assigned to the assignee hereof, and expressly incorporated herein.

FIELD OF TECHNOLOGY

The present disclosure relates generally to database systems and data processing, and more specifically to automated network link repair.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may be configured with data links configured to transport data across the platform or to services and entities outside of the platform. In some cases, one or more of the data links may fail (e.g., because of physical damage to hardware, configuration errors, data congestion, etc.), which may cause latency, increased data signaling related to resending data packets, among other performance issues. Some systems supporting data links configured to transport data can be improved.

DETAILED DESCRIPTION

Figure 1:
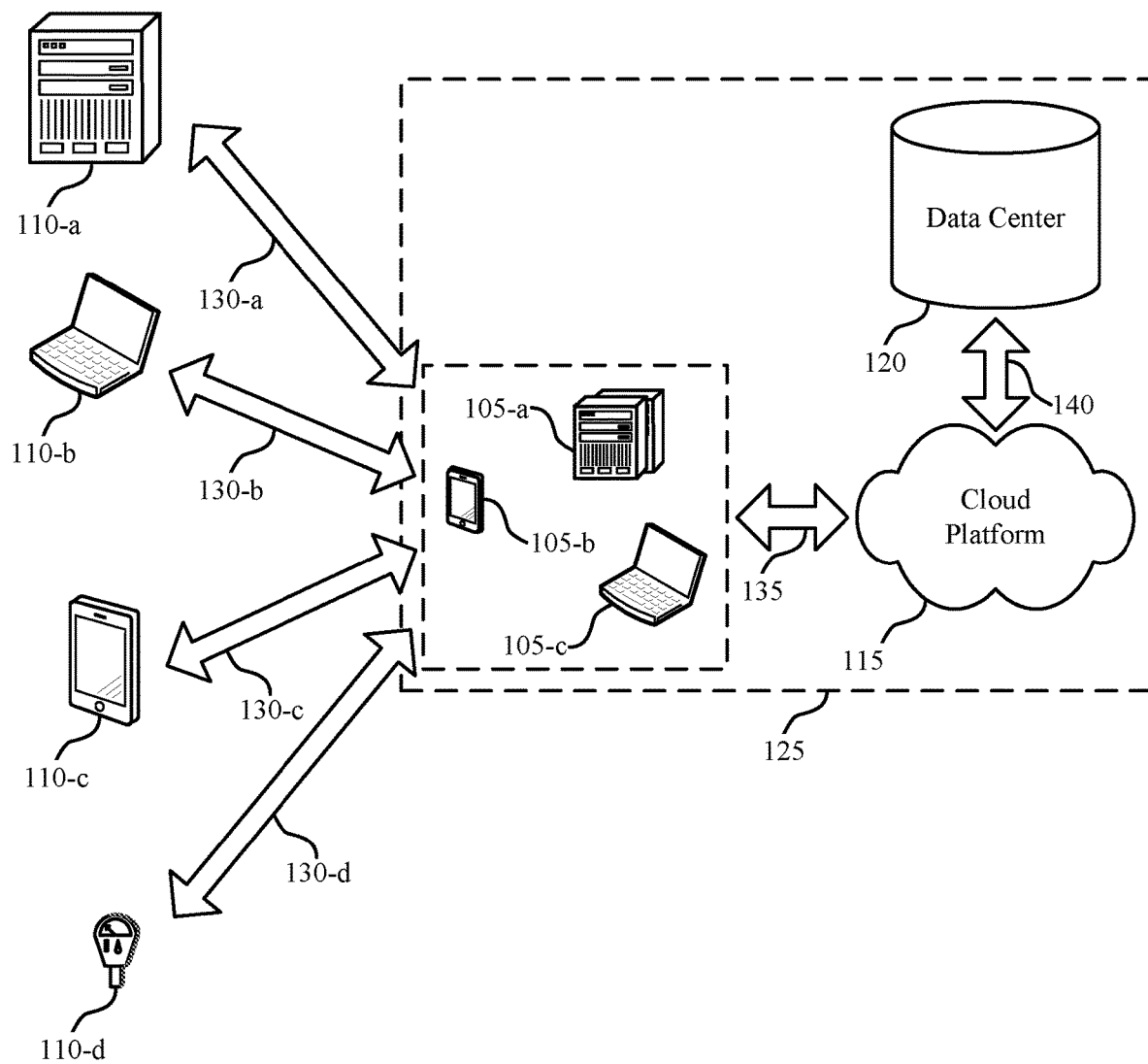
FIG. 1 illustrates an example of a system for data processing that supports automated network link repair in accordance with aspects of the present disclosure.

A computing system, such as a cloud-based platform or database system, may include various data links connecting different aspects of the system (e.g., nodes, databases, servers, etc.). A datacenter may include data links configured to transport data across the platform or to services and entities outside of the platform. Such data links may be prone to failure (e.g., from physical hardware failure or the like). Data link failures may manifest as cyclic redundancy check (CRC) framing errors on data links inside a datacenter network. Such data link failures may cause data transfer latency, dropped packets, unnecessary retransmissions of packets, among other performance issues, and may results in poor user experience. The process of identifying and fixing failed data links may involve a lengthy and manual process, requiring multiple handoff points between various teams or entities.

One or more aspects of the present disclosure support automatically monitoring for and identifying failed or faulty links and automatically removing customer traffic (e.g., drain data) from the faulty link. In accordance with aspects of the present disclosure, a system including a service or combination of services working in coordination may automatically monitor and identify faulty links. In particular, the present disclosure provides for a system including a service or combination of services working in coordination to update a configuration of a network device to route traffic from a faulty link to a working link until the faulty link is repaired. For example, the services in the system may be configured with a threshold and/or adaptive intelligence to determine a threshold of a number or type of data links that can be drained at a time based on a number of factors (e.g., priority of data links, priority of traffic, priority of tenants, traffic patterns, anticipated traffic patterns, network health, etc.). In some aspects, a maximum threshold may be configured for the number of drained links such that the number of drained links will not exceed the configured threshold.

The service may automatically generate a repair ticket such that a user (e.g., datacenter engineer) can perform a repair action to the faulty data links. In some instances, the system may generate and dispatch a repair ticket to an entity or service responsible for fixing the faulty data link (e.g., an engineering team). While the faulty data link is being repaired, the system may probe (e.g., send test packets) the links by continuously forwarding traffic across the drained link to ensure that instant feedback is available (e.g., to the engineering team fixing the link). The system may recognize when a ticket has been resolved or closed and automatically return the repaired data links to service. For instance, once a repair to the link has been made, the system may receive an indication of the repair and reroute customer data back to the fixed data links. This process may include changing a border gateway protocol state of the repaired links to an active or "up" state. The system may also update an interface of the network device to indicate that at least one faulty link has been repaired. As described in more detail herein, such a system may reduce the time needed to identify and resolve faulty data links (e.g., by reducing the number of steps or handoffs in the process), which may decrease latency, increase throughout, reduce signaling overhead, among the performance improvements to a computing system.

Aspects of the disclosure are initially described in the context of an environment supporting an on-demand database service. Aspects of the disclosure are further described in the context of an example system, process flow, and data link error resolution graph. Aspects of the disclosure are further illustrated by and described with reference to apparatus diagrams, system diagrams, and flowcharts that relate to automated network link repair.

FIG. 1 illustrates an example of a system 100 for cloud computing that supports automated network link repair in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The data center 120 may be example of a multi-tenant system that supports data storage, retrieval, data analytics, and the like for various tenants, such as the cloud clients 105. In particular, the data center 120 may support techniques for automatically identifying and fixing faulty data links. As such, each cloud client 105 may be provided with a database instance in the datacenter 120, and each database instance may store various datasets that are associated with the particular cloud client 105. More particularly, each cloud client 105 may have a specific set of datasets that are unique for the cloud client 105. The cloud platform and datacenter 120 support a system that processes set of datasets for a particular cloud client 105. Additionally or alternatively, the subsystem 125 may support a number of applications, pages, or both for displaying components related to CRM processes, data management, messaging, or any other supported functionality. As depicted herein, the data center 120 may support data links configured to transport data across the subsystem 125 or to services and entities outside of the subsystem 125. In some examples, the data center 120 may support or include one or more services, such as a monitoring service, a control service, one or more repair agents (which may be referred to as "minions"), and an interface or service having a user interface or dashboard for user input by a team or user that is responsible for fixing faulty data links (e.g., by fixing physical hardware) and closing repair tickets.

In a conventional system, a network operator may have to manually consume data from a monitoring service to identify faulty data links. In particular, an operations engineer may be responsible for managing network data plane and connectivity). Generally, connections between network elements include hardware and as a result data links may be prone to failure. Data link failures may manifest as CRC framing errors on data links inside a datacenter network (e.g., data center 120). This can cause issues with data transfer latency and result in poor customer experience.

In a conventional system, if a faulty data link is identified after manual consumption of data, a network operator may manually drain a border gateway protocol session on the identified faulty data link. The time between identifying the faulty data links and draining (e.g., removing customer traffic) may be substantial, because such a process may require a manual process and/or a handoff between teams or entities. For instance, a network operator may manually generate or escalate a repair ticket to a team or service that is responsible for manually cleaning the data link or repairing physical connectivity hardware. The repair team may execute physical checks and perform cleaning or repair actions on the faulted data links, and then the repair team may request that the network operator verify whether the data link is clean. The network operator may then log into the system to test the drained link manually. If the data link is repaired (e.g., clean), then the network operator may undrain the link (e.g., return the link to service by routing customer data back through the link). If the link is not clean, then the network operator may then iterate again with the repair team. This may be a manually and lengthy process with varying resolution times because of the number of handoff points between teams. Such data link failures can cause issues with data transfer latency, dropped packets and unnecessary retransmissions of packets. Also, there may be no way to coordinate or limit the number of data links that are being drained at a given time, which may affect latency, throughput, among other performance factors, for a network or database system. Thus, the process of identifying and fixing failed data links may involve a lengthy and manual process.

In contrast, the cloud platform and datacenter 120 support a system that supports techniques for automated network link repair. In particular, one or more aspects of the present disclosure provide for one or more services to work in coordination to automatically monitor for faulty data links, automatically drain the data links and/or reroute customer traffic from the faulty data links so that transmission errors and latency are mitigated (e.g., as compared to manually identified and draining a link). The system 100 may also improve the user experience at user devices by reducing latency by automatically repairing faulted links. The system 100 may include a service or combination of services working in coordination to update configuration of a network device to route traffic from a faulty link to a working link until the faulty link in repaired. One or more of the services may be configured with a threshold and/or adaptive intelligence to determine a threshold of a number of data links that can be drained at a time based on a number of factors (e.g., priority of data links, priority of traffic, priority of tenants, traffic patterns, anticipated traffic patterns, network health, etc.). For instance, the system 100 may determine that a number of drained links will not exceed a defined threshold and the actions taken when that threshold is reached will be defined in coordination with a network operator.

The one or more services may automatically generate a repair ticket such that a user can perform a repair action to the faulty data links. During time of repair, the system 100 may support a prober software to continuously forward traffic forcefully across the drained link to ensure instant feedback is available to the repair team. Once manual repairs have taken place, the system 100 may recognize that a ticket has been closed. When the system 100 determines that the ticket has been closed, the system 100 may automatically return the one or more data links to service (e.g., by changing a border gateway protocol state of a link to an active or "up" state). In addition, a "minion" as depicted herein, may consume the state change and reconfigure a session into a desired state.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
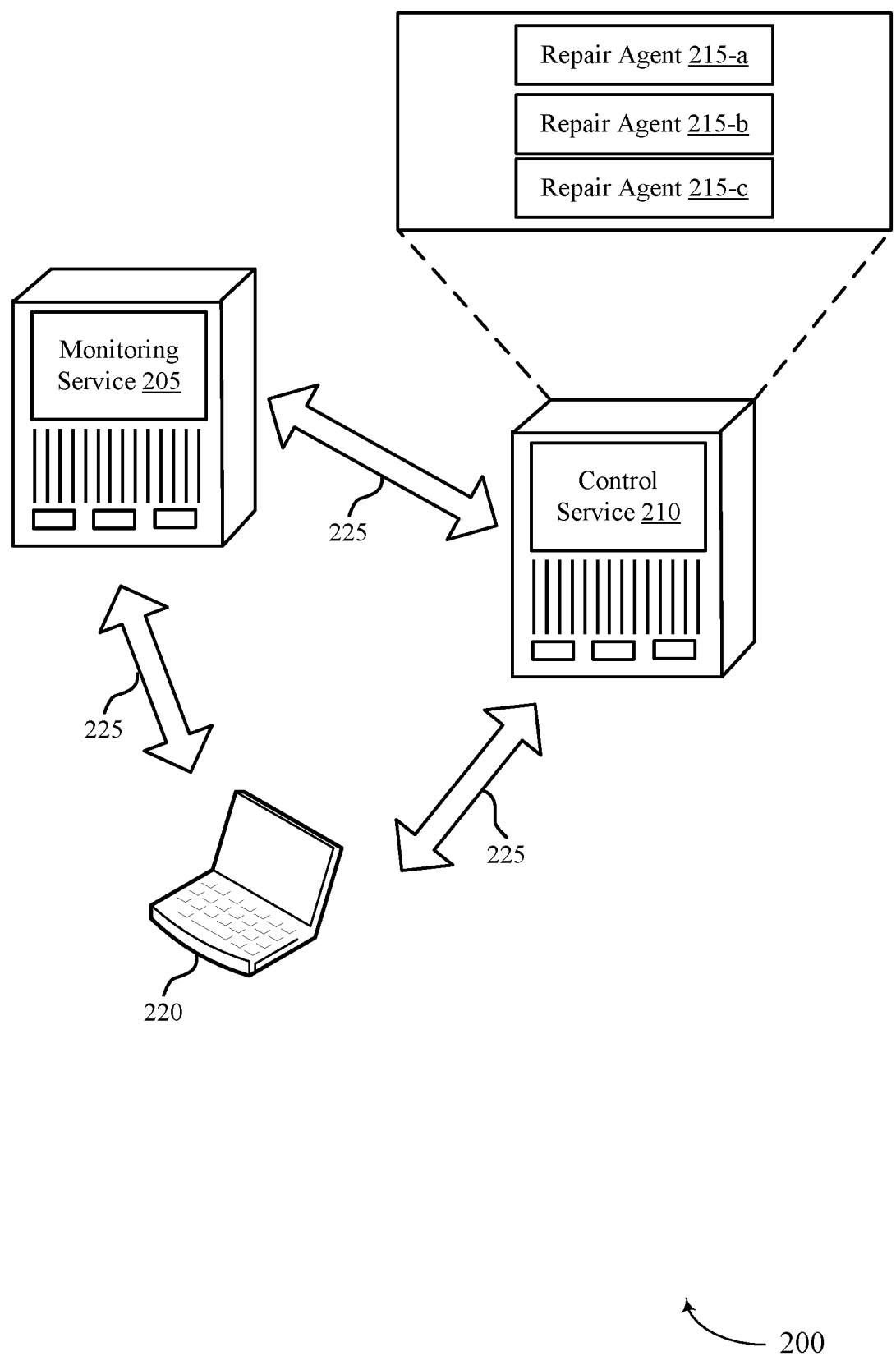
FIG. 2 illustrates an example of a system for data processing that supports automated network link repair in accordance with aspects of the present disclosure.

FIG. 2 illustrates an example of a system 200 that supports automated network link repair in accordance with aspects of the present disclosure. System 200 may include a monitoring service 205, a control service 210, one or more repair agents 215, and a user device 220. The monitoring service 205 and the control service 210 may be hosted in application servers (same or different). The server may be examples of aspects of the cloud platform 115 and the datacenter 120 of FIG. 1. In addition, the services may be represented as various devices and components that support an automatic link repair data as described herein. The system 200 may support a multi-tenant database system, which may manage various datasets that are associated with specific tenants (e.g., cloud clients 105). These entities and services may communicate over communication links 225.

Monitoring service 205 may be an example of a service configured to automatically expose or identify faulty data links (e.g., links that require repair). The monitoring service 205 may include a user interface and an API. The monitoring service 205 continuously monitors data links across a system (e.g., a network system or database system such as a system shown in FIG. 1) and exposes faulted links via the API and/or user interface. Monitoring for and identifying faulty data links may include identifying and/or counting a number of failed data transmission or receptions across a data link.

Control service 210 may be an example of a service configured to automatically remove (e.g., drain) data traffic (e.g., customer data traffic) from the faulty link, either by the control service 210 or by controlling or instructing a repair agent 215 to perform the task. The monitoring service 205 may indicate the one or more identified faulty data links via a communications link 225. Such a process may ensure that the impact of the faulty link is quickly mitigated. In some aspects, the number of drained links may not exceed a defined threshold (e.g., for a given time period). The actions that the system 200 takes when the configured threshold is reached (or comes within a threshold number) may be defined in coordination with one or more teams or entities responsible for maintaining the system 200.

The control service 210 may include or otherwise control one or more repair agents 215. The repair agents 215 may be examples of services, machines, workers etc. that perform tasks of work assigned to them (e.g., by the control service 210). In some examples, repair agents 215 may be referred to as "minions." A repair agent 215 may, for example, drain data traffic from a data link, reroute data traffic, change a border gateway protocol state of a data link, reconfigure a session into a desired state, or any combination of these or similar tasks. In some examples, the system 200 may measure and report a resolution time associated with the time it takes for a faulty link to be taken out of a path of customer traffic. Similarly, the system 200 may measure and report a resolution time associated with the time it takes for a faulty link to be fully repaired and put back into service.

In some examples, the monitoring service 205 may identify one or more faulted data links associated with a network device of a datacenter (e.g., datacenter 120 as depicted in FIG. 1). For instance, the monitoring service 205 may automatically expose faulty data links requiring repair. Once exposed, another service (e.g., the control service 210) may automatically remove (or drain) customer traffic from the faulty link ensuring that customer impact is mitigated. In order to remove customer traffic from one or more faulted data links, the control service 210 may update a configuration of the network device. That is, the control service 210 may update the configuration to remove data traffic from the identified one or more faulted data links based on a redundancy threshold associated with the network device.

The control service 210 may determine whether a number of the identified one or more faulted data links satisfies a configured threshold. In some examples, the control service 210 may determine to update the configuration of the network device based on the number of the identified one or more faulted data links satisfying the configured threshold. In some examples, the control service 210 may identify a defined action to take in response to the number of the identified one or more faulted data links satisfying the configured threshold. In some examples, the number of drained links may not exceed a defined threshold and the actions to be taken if the threshold is reached may be defined in coordination with a network operator.

One or more aspects of the present disclosure may provide for the control service 210 to measure a resolution time associated with repairing each of the identified one or more faulted data links. The individual resolution times may be measured and conveyed to the network devices (e.g., users associated with the network devices). In some examples, the control service 210 may calculate a time for a faulty link to be taken out of the path of data traffic and a time it takes for a link to be fully repaired and put back into service. In some examples, the control service 210 may update a border gateway protocol state of the identified one or more faulted data links to an inactive state based on removing the data traffic from the identified one or more faulted data links.

Once a faulty data link (e.g., also referred to as an interface) is drained, the system 200 may automatically dispatch a repair ticket to an entity or service to notify that a repair action (e.g., a physical repair action) is required to fix the faulty data links. That is, the system 200 may generate a repair ticket message associated with the identified one or more faulted data link. In some examples, the control service 210 may transmit a repair ticket to user device 220, which may be associated with a team (e.g., a network operations or maintenance engineering team) responsible for fixing the faulty data link. While a link is being repaired, a prober software may continuously forward traffic (e.g., test traffic) forcefully across the drained links to ensure instant feedback is available to the engineering team in response to repair actions being performed by the team. In some examples, the system 200 may provide for transmitting test traffic across the identified one or more faulted data links while monitoring for a repair ticket resolution message associated with repairing the identified one or more faulted data links. The system 200 may probe the identified one or more faulted data links to continuously forward the test traffic across the identified one or more faulted data links. The system 200 may further implement a feedback loop to generate feedback associated with repair actions for the identified one or more faulted data links based on probing the identified one or more faulted data links.

In some examples, information related to the identified faulty data link and/or the generated feedback is displayed on a dashboard (e.g., of a user interface of user device 220) so that a user can inspect the logical error-state of a data link after each repair action is taken. That is, the system 200 may cause for display at a user interface an indication of an error state of the identified one or more faulted data links. In some examples, the dashboard will display information related to the monitoring service 205 such that a user can view the monitoring service 205 directly to see link health. Once the link is repaired (e.g., clean), a user may be indicated via the dashboard that the repair is completed, and the system (e.g., via user device 220) may update the repair ticket to a resolved state. In the example of FIG. 2, the system 200 may update a border gateway protocol state of the identified one or more faulted data links to an active state based on determining that the repair ticket message is resolved.

Once the repair ticket is resolved, the system 200 may initiate an action to update a state identifier associated with the identified one or more faulted data links based on determining that the repair ticket message is resolved. For instance, an action is triggered to change the desired border gateway protocol state of the data links to an active or "up" state. In some examples, a repair agent 215 may consume this state change and reconfigure the session into the desired state. Upon activating the faulted link, the system 200 may be configured to reroute the data traffic back to the one or more identified faulted data links. In some examples, the system 200 may reroute the data traffic back to the one or more identified faulted data links based on receiving the repair ticket resolution message.

Figure 3:
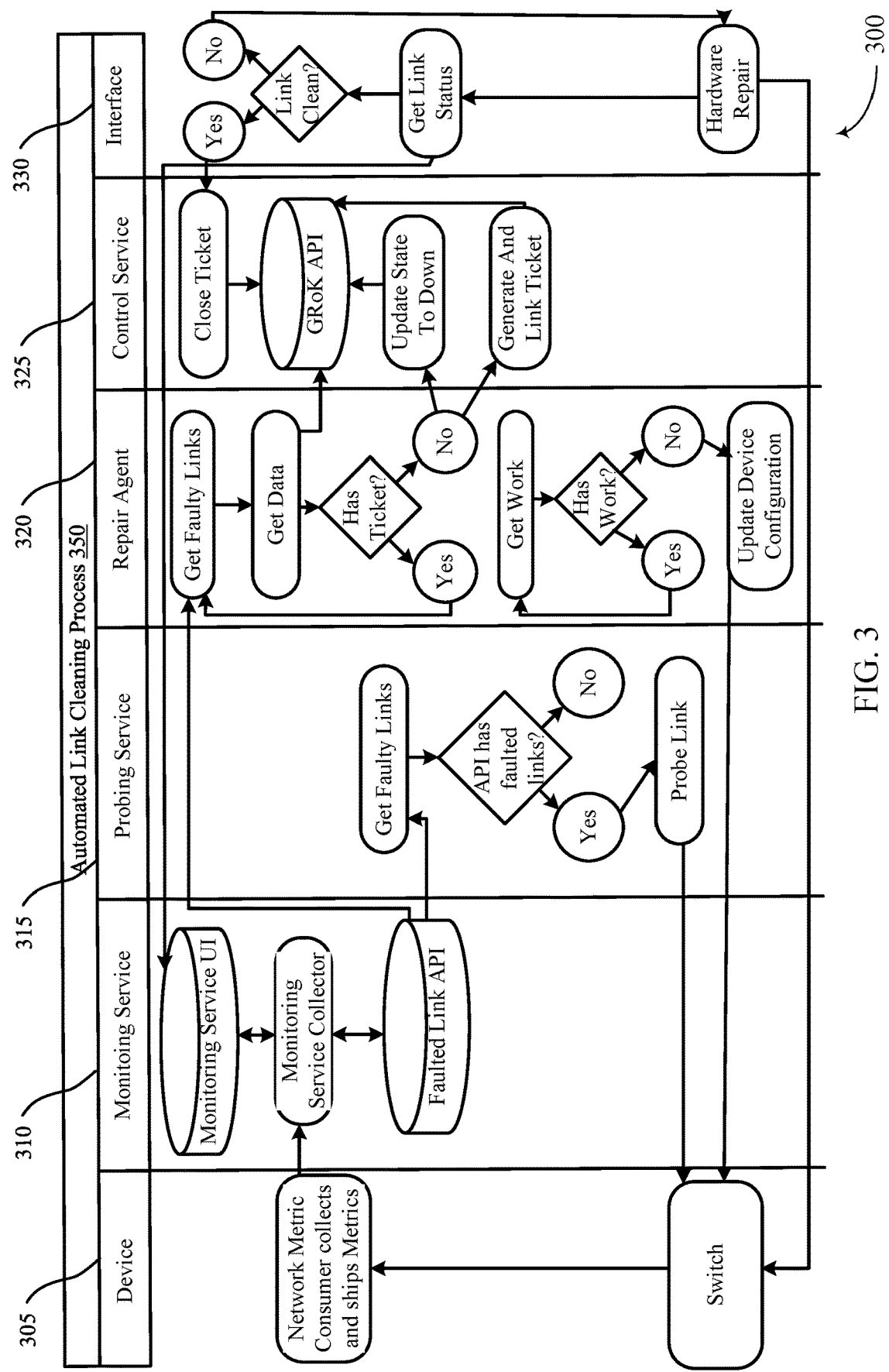
FIG. 3 illustrates an example of a process flow diagram that supports automated network link repair in accordance with aspects of the present disclosure.

FIG. 3 illustrates an example of a process flow diagram 300 that supports automated network link repair in accordance with aspects of the present disclosure. The process flow diagram 300 may include one or more services, entities, nodes, etc. configured to perform various functions as described with respect to FIG. 2. For example, the process flow diagram 300 describes an automated link cleaning process 350. The process flow diagram 300 may include a device 305, a monitoring service 310, a probing service 315, a repair agent 320, a control service 325, and an interface 330 for a team or entity responsible for repairing a data link.

In the following description of process flow diagram 300, the operations between the various entities and services may be transmitted in a different order than the order shown, or the operations performed by the various entities and services may be performed in different orders or at different times. For example, specific operations may also be left out of process flow 300, or other operations may be added to process flow 300.

The device 305 may include or be an example of a network metric consumer that collects metrics and ships the metrics to the monitoring service 310. The metrics collected (e.g., the number of transmission errors, reception errors, dropped packets, etc.) for one or more data links may be conveyed to the monitoring service 310, which may include a monitoring collector that analyzes counters, and identifies or exposes faulted links via a user interface of the monitoring service 310 or a faulted link API of the monitoring service 310.

The user interface of the monitoring service 310 may communicate with the interface 330 to facilitate a user monitoring or accessing link status or health. In some examples, the monitoring service 310 may identify one or more faulted data links associated with a network device of the datacenter. As depicted herein, the monitoring service 310 may identify the one or more faulted data links based on receiving the network metric from the device 305 at the monitoring service collector. The faulted link API of the monitoring service 310 may communicate with the probing service 315 and the repair agent 320 in response to a query or trigger by the probing service 315 or the repair agent 320 to obtain a list of faulty data links.

The probing service 315 may obtain the faulty data links from the monitoring service 305 (e.g., via the faulted link API) and may determine whether the API indicates the presence of faulted links. If yes, then the probing service 315 may probe the one or more identified faulty data links (e.g., by sending test packets across the links for the duration of the repair of the links). That is, the probing service 315 may probe the identified one or more faulted data links to continuously forward the test traffic across the identified one or more faulted data links. On the other hand, if there is a determination that the API does not indicate faulted data links, then the probing service 315 may repeat the process of obtaining or identifying faulted data links from the monitoring service 310.

The repair agent 320 (which may also be referred to as a minion) may be an example of any service, entity, server, machine, etc. that is configured to perform a task or work assigned to it by another entity (e.g., control service 325). The repair agent 320 may obtain the faulty data links from the monitoring service 305 (e.g., via the faulted link API). In some examples, after obtaining the faulty data links, the repair agent 320 may obtain data from the control service 325. In some examples, the control service 325 may be an example of a GRoK web service control framework, although any other control service configured to control workers or services by assigning tasks or work items to identify and fix network links may be used. The repair agent 320 may obtain data from GRoK API included in the control service 325. After obtaining the data from the control service 325, the repair agent 320 may determine whether a ticket has been opened or generated for the identified one or more faulty data links. If a ticket has not been opened, then the repair agent 320 may send a trigger to the control service 325 to generate a ticket and link the ticket to the one or more faulty data links. In some examples, the control service 325 will generate a repair ticket. For example, the control service 325 may generate a repair ticket message associated with the one or more faulted data links identified by the monitoring service 310. The control service 325 may then transmit the ticket to the interface 330 (e.g., for display on a user interface such as a dashboard, or otherwise to notify a user or entity that a repair to a data link needs to be performed).

The repair agent 320 may request or otherwise receive work (e.g., tasks) from the control service 325 (e.g., in response to the control service 325 generating a new ticket for a data link repair). For instance, upon identifying one or more faulted data links, the repair agent 325 may update the configuration to remove data traffic from the identified one or more faulted data links based on a redundancy threshold. For example, for a particular tenant, connection, or service, there may be a number of redundant data links configured to service that tenant, connection or service. Further, depending on a configuration (e.g., based on priority, service level agreement, etc.), a redundancy threshold may be configured that defines how many of the redundant links should be operational (or how many can be down or under repair) at a given time. As such, if the number or faulty data links exceeds the redundancy threshold (e.g., such that a particulate tenant, connection, or service no longer has a configured minimum number of working redundant data links), then the control service 325 may initiate some repair action as described herein.

Upon receiving the work from the control service 325, the repair agent 320 may perform one or more tasks associated with the data links in accordance with the work (e.g., drain customer data from one or more faulty data links, reroute traffic, etc.). In some examples, a maximum threshold may be configured, such that the number of drained links will not exceed the defined threshold and the actions taken when that threshold is reached may be defined in coordination with one or more other entities or services. Additionally or alternatively, the repair agent 320 and/or the control service 325 may be configured with logic or intelligence (e.g., via programming and/or machine learning techniques) to determine an order or priority regarding which data links to repair (e.g., based on current traffic, tenant priority, data priority, past traffic behavior, or other factors) to further optimize the process of automatically identifying and repairing faulty data links. In some examples, the repair agent 320 may update a device configuration and/or a state of a data link.

In some examples, a repair agent 320 may be stateless. In such examples, the repair agent 320 may leverage a lock and lease mechanism associated with the control service 325 (e.g., a GRoK lock and lease) to coordinate and recover work. In some examples, a repair agent 320 may explicitly signal to the control service 325 that it is completely finished with a task (e.g., that the task is completed, not just "done"), so that the control service 325 does not inadvertently assign the repair agent 320 another task while it is still performing a first task.

The control service 325 may include an API (e.g., a GRoK API) that interfaces with one or more other services or entities to perform functions related to automatically repairing a faulty network link. In some examples, the control service 325 may update a border gateway protocol state of the identified one or more faulted data links to an inactive state based on the removing the data traffic from the identified one or more faulted data links. The control service 325 may update a state or status of a data link to an inactive or "down" state upon determining that a data link is faulty.

As described herein, the control service 325 may generate and link a repair ticket (e.g., upon being triggered by a repair agent 320). The control service 325 may also receive an indication that a repair ticket has been closed (e.g., from the interface 330), and store or convey this information via the GRoK API.

The interface 330 may be associated with a service or team that is responsible for repairing (e.g., performing troubleshooting and/or physical repair to one or more faulty data links). For example, the interface 330 may include a dashboard or other similar user interface for viewing a status of a data link (e.g., via the monitoring service 310). A user associated with the interface 330 may perform a repair (e.g., a hardware repair), and may indicate that the data link has been fixed, which may trigger the corresponding repair ticket to be closed.

When the data link has been repaired, the control service 325 may receive a repair ticket resolution message. The repair ticket resolution message may be based on a repair ticket message generated at the control service 325. In some cases, the repair ticket resolution message may be associated with a repair action associated with the identified one or more faulted data links. Upon receiving the repair ticket resolution message, the control service 325 may determine that the repair ticket message is resolved. The control service 325 may initiate an action to update a state identifier associated with the identified one or more faulted data links based on determining that the repair ticket message is resolved. The control service 325 may update a state or status of a data link to an active or "up" state upon determining that the data link has been fully repaired.

Additionally or alternatively, the control service 325 may update a border gateway protocol state of the identified one or more faulted data links to an active state based on determining that a repair ticket message is resolved. When the data link has been repaired, the control service 325 may reroute the data traffic back to the one or more identified faulted data links. In some examples, the control service 325 may reroute the data traffic based on receiving the repair ticket resolution message. Additionally or alternatively, the repair agent 320 may generate a signal indicating that a repair action associated with the identified one or more faulted data links is completed.

Figure 4:
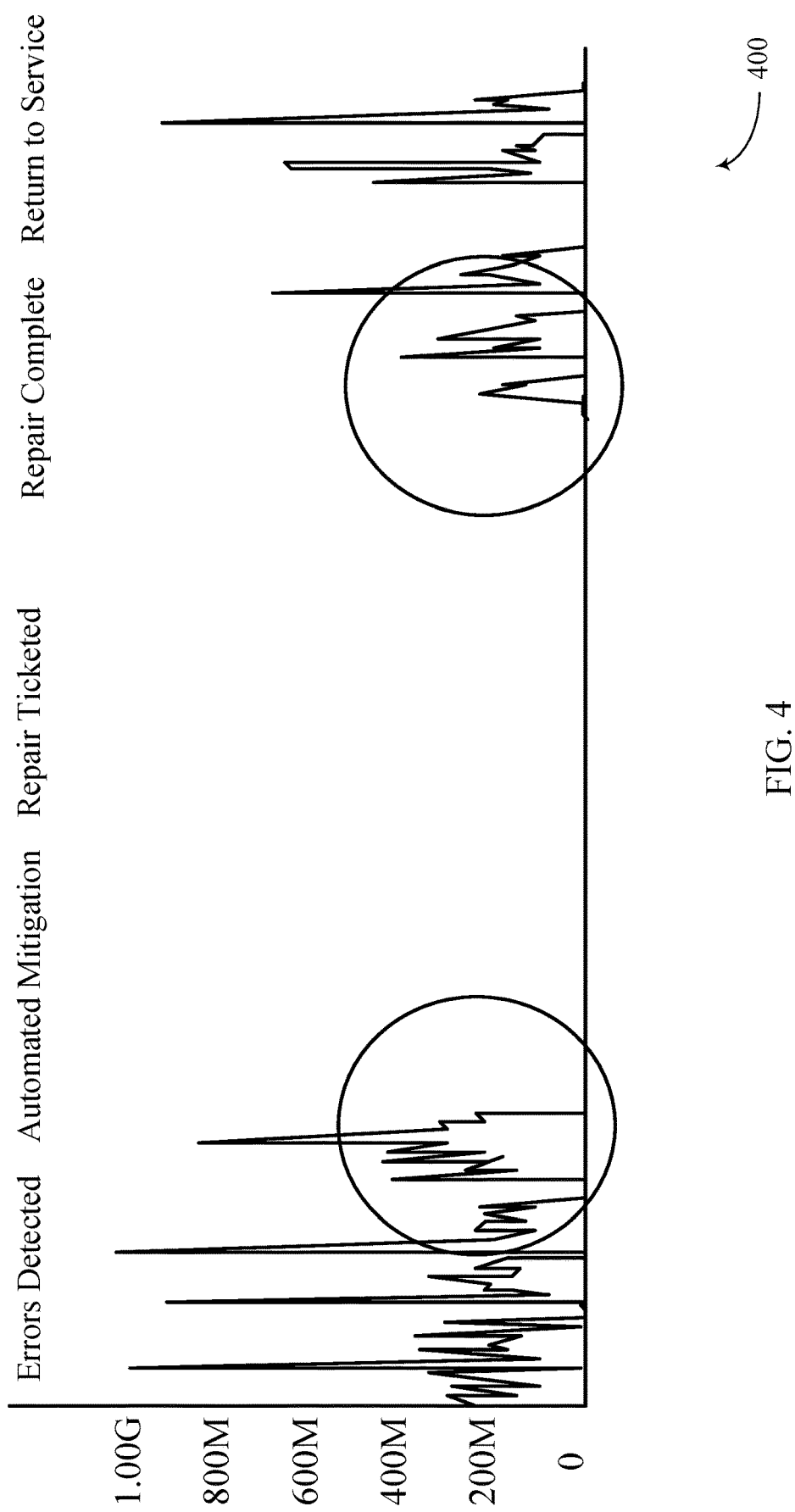
FIG. 4 illustrates an example of an error resolution graph that supports automated network link repair in accordance with aspects of the present disclosure.

FIG. 4 illustrates an example of a network link resolution graph 400 that supports automated network link repair in accordance with aspects of the present disclosure. The example graph 400 shows the number of errors detected (e.g., faulty links measured by reception drops, transmission drops, reception errors, transmission errors, CRC framing errors, or any other similar metric) over time as aspects of the present disclosure are implemented. The network link resolution graph 400 shows errors detected, automated mitigation, repair ticketed, repair complete, and return to service.

As depicted in the example of FIG. 4, during a first portion of the graph 400, a system (e.g., as described with reference to FIGS. 1-3) may detect link errors (as shown in the spiking error portion) using a monitoring service. During a second portion of the graph 400, a system may implement one or more automated mitigation techniques as described here such as automatically draining faulty links, changing a state of one or more links, rerouting data traffic, etc. In particular, the system may implement one or more automated network link repair techniques to detect errors with data links, open repair ticket, automatically repair the faulty links, and close the repair ticket. As shown, the number of detected errors may significantly decrease once the automated mitigation errors are implemented. The system may generate a ticket and receive an indication of the ticketing being repaired, during which the number of errors may be kept low.

Figure 5:
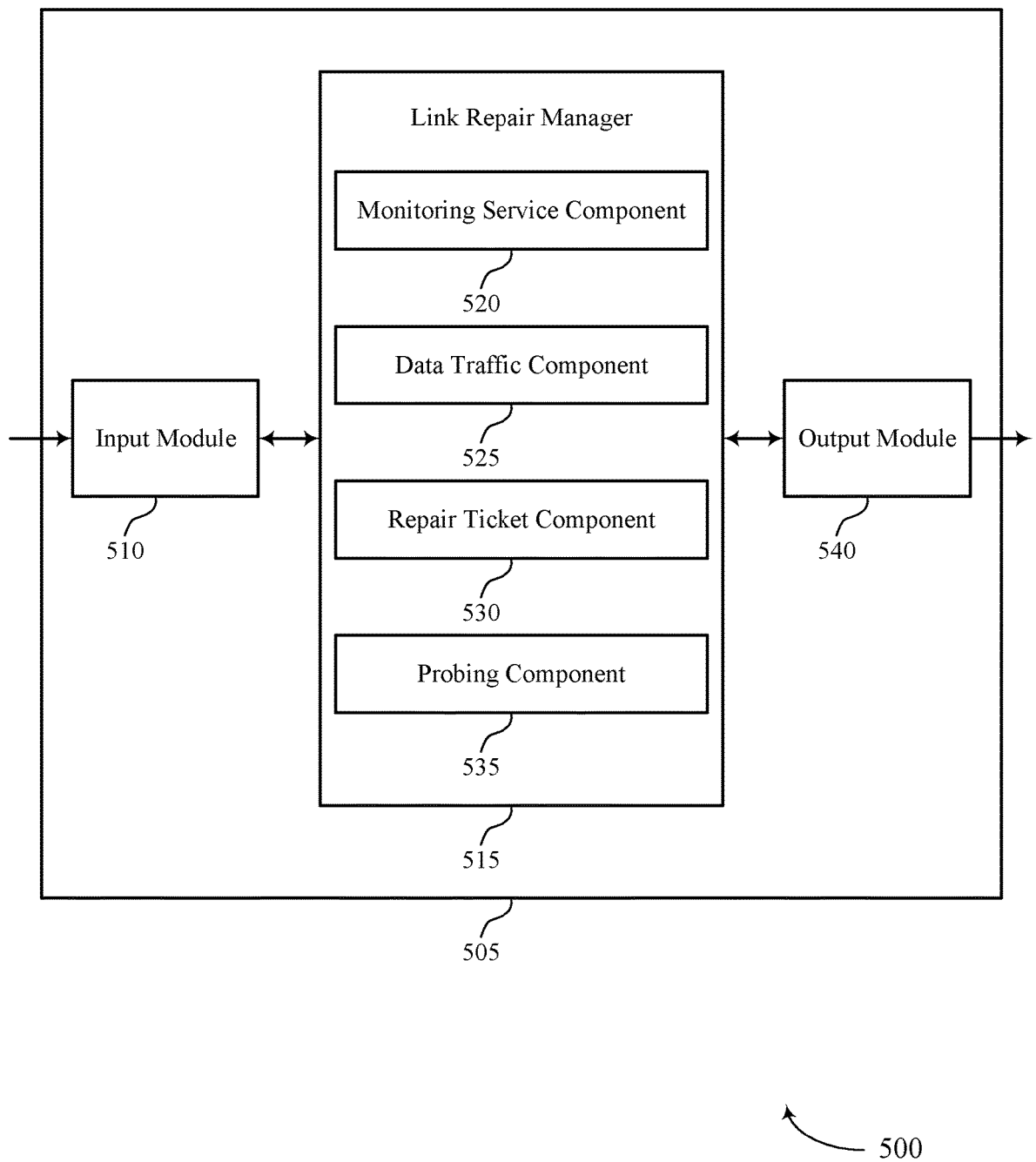
FIG. 5 shows a block diagram of an apparatus that supports automated network link repair in accordance with aspects of the present disclosure.

FIG. 5 shows a block diagram 500 of an apparatus 505 that supports automated network link repair in accordance with aspects of the present disclosure. The apparatus 505 may include an input module 510, a link repair manager 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the link repair manager 515 to support automated network link repair. In some cases, the input module 510 may be a component of an input/output (I/O) controller 715 as described with reference to FIG. 7.

The link repair manager 515 may include a monitoring service component 520, a data traffic component 525, a repair ticket component 530, and a probing component 535. The link repair manager 515 may be an example of aspects of the link repair manager 605 or 710 described with reference to FIGS. 6 and 7.

The link repair manager 515 and/or at least some of its various sub-components may be implemented in hardware, software executed by a processor, firmware, or any combination thereof. If implemented in software executed by a processor, the functions of the link repair manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The link repair manager 515 and/or at least some of its various sub-components may be physically located at various positions, including being distributed such that portions of functions are implemented at different physical locations by one or more physical devices. In some examples, the link repair manager 515 and/or at least some of its various sub-components may be a separate and distinct component in accordance with various aspects of the present disclosure. In other examples, the link repair manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The monitoring service component 520 may identify, by a first service, one or more faulted data links associated with a network device of the datacenter. The data traffic component 525 may update, by a second service, a configuration of the network device to remove data traffic from the identified one or more faulted data links based on a redundancy threshold associated with the network device.

The repair ticket component 530 may generate a repair ticket message associated with the identified one or more faulted data links. The probing component 535 may transmit test traffic across the identified one or more faulted data links while monitoring for a repair ticket resolution message associated with repairing the identified one or more faulted data links.

The output module 540 may manage output signals for the apparatus 505. For example, the output module 540 may receive signals from other components of the apparatus 505, such as the link repair manager 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
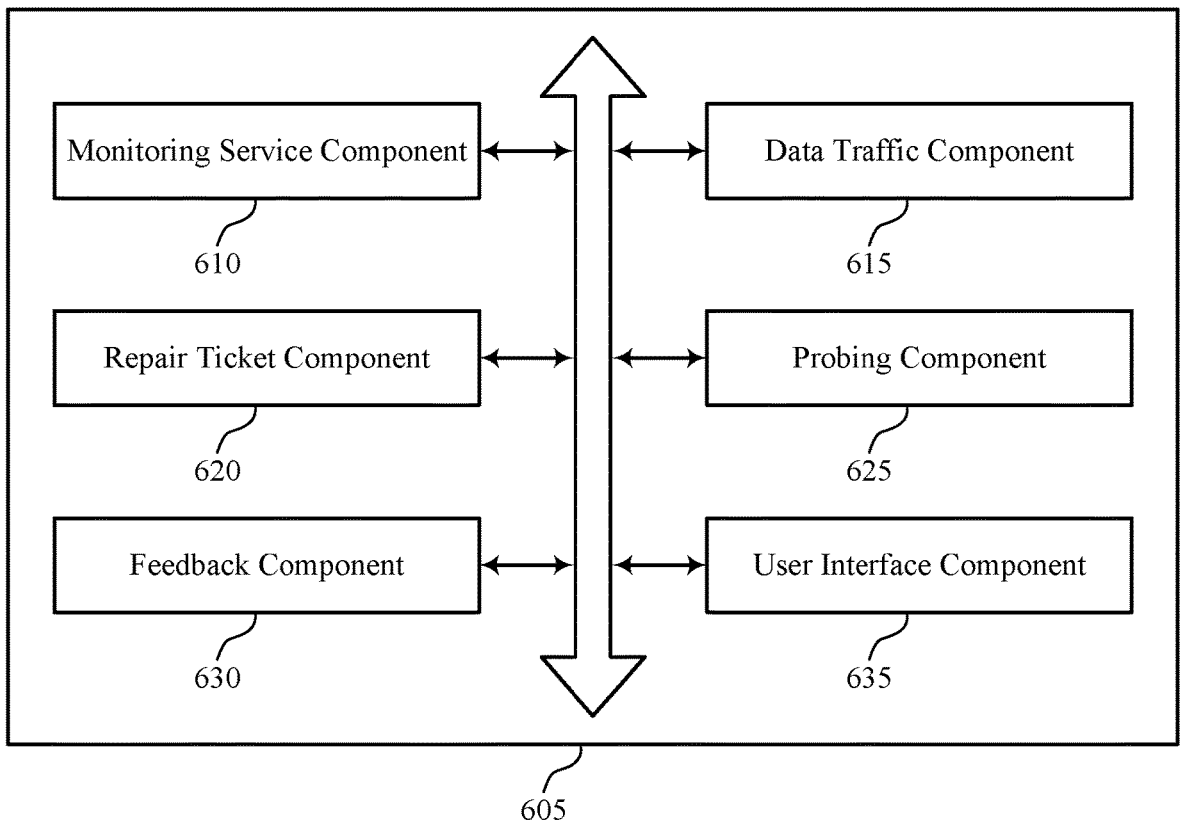
FIG. 6 shows a block diagram of a link repair manager that supports automated network link repair in accordance with aspects of the present disclosure.

FIG. 6 shows a block diagram 600 of a link repair manager 605 that supports automated network link repair in accordance with aspects of the present disclosure. The link repair manager 605 may be an example of aspects of a link repair manager 515 or a link repair manager 710 described herein. The link repair manager 605 may include a monitoring service component 610, a data traffic component 615, a repair ticket component 620, a probing component 625, a feedback component 630, and an user interface component

635. Each of these modules may communicate, directly or indirectly, with one another (e.g., via one or more buses).

The monitoring service component 610 may identify, by a first service, one or more faulted data links associated with a network device of the datacenter. The data traffic component 615 may update, by a second service, a configuration of the network device to remove data traffic from the identified one or more faulted data links based on a redundancy threshold associated with the network device. In some cases, the first service includes an automatic monitoring service and the second service includes an automated network repair agent.

The repair ticket component 620 may generate a repair ticket message associated with the identified one or more faulted data links. The probing component 625 may transmit test traffic across the identified one or more faulted data links while monitoring for a repair ticket resolution message associated with repairing the identified one or more faulted data links.

In some examples, the monitoring service component 610 may determine whether a number of the identified one or more faulted data links satisfies a configured threshold. In some examples, the data traffic component 615 may determine to update the configuration of the network device based on the number of the identified one or more faulted data links satisfying the configured threshold.

In some examples, the data traffic component 615 may identify a defined action to take in response to the number of the identified one or more faulted data links satisfying the configured threshold. In some examples, the probing component 625 may probe the identified one or more faulted data links to continuously forward the test traffic across the identified one or more faulted data links.

The feedback component 630 may implement a feedback loop to generate feedback associated with repair actions for the identified one or more faulted data links based on probing the identified one or more faulted data links. In some examples, the data traffic component 615 may update a border gateway protocol state of the identified one or more faulted data links to an inactive state based on removing the data traffic from the identified one or more faulted data links. In some examples, the data traffic component 615 may measure a resolution time associated with repairing each of the identified one or more faulted data links.

In some examples, the repair ticket component 620 may receive a repair ticket resolution message based on generating the repair ticket message, wherein the repair ticket resolution message is associated with a repair action associated with the identified one or more faulted data links. In some examples, the repair ticket component 620 may determine that the repair ticket message is resolved based on receiving the repair ticket resolution message. In some examples, the data traffic component 615 may initiate an action to update a state identifier associated with the identified one or more faulted data links based on determining that the repair ticket message is resolved.

In some examples, the data traffic component 615 may update a border gateway protocol state of the identified one or more faulted data links to an active state based on determining that the repair ticket message is resolved. In some examples, the data traffic component 615 may reroute the data traffic back to the one or more identified faulted data links based on receiving the repair ticket resolution message.

In some examples, the data traffic component 615 may generate, by the second service, a signal indicating that the second service has completed a repair action associated with the identified one or more faulted data links.

In some examples, the data traffic component 615 may generate, by the second service, a signal indicating that the second service has completed a repair action associated with the identified one or more faulted data links.

The user interface component 635 may cause for display at a user interface an indication of an error state of the identified one or more faulted data links. In some examples, the data traffic component 615 may detect a threshold number of transmission errors or reception errors associated with the one or more faulted data links.

Figure 7:
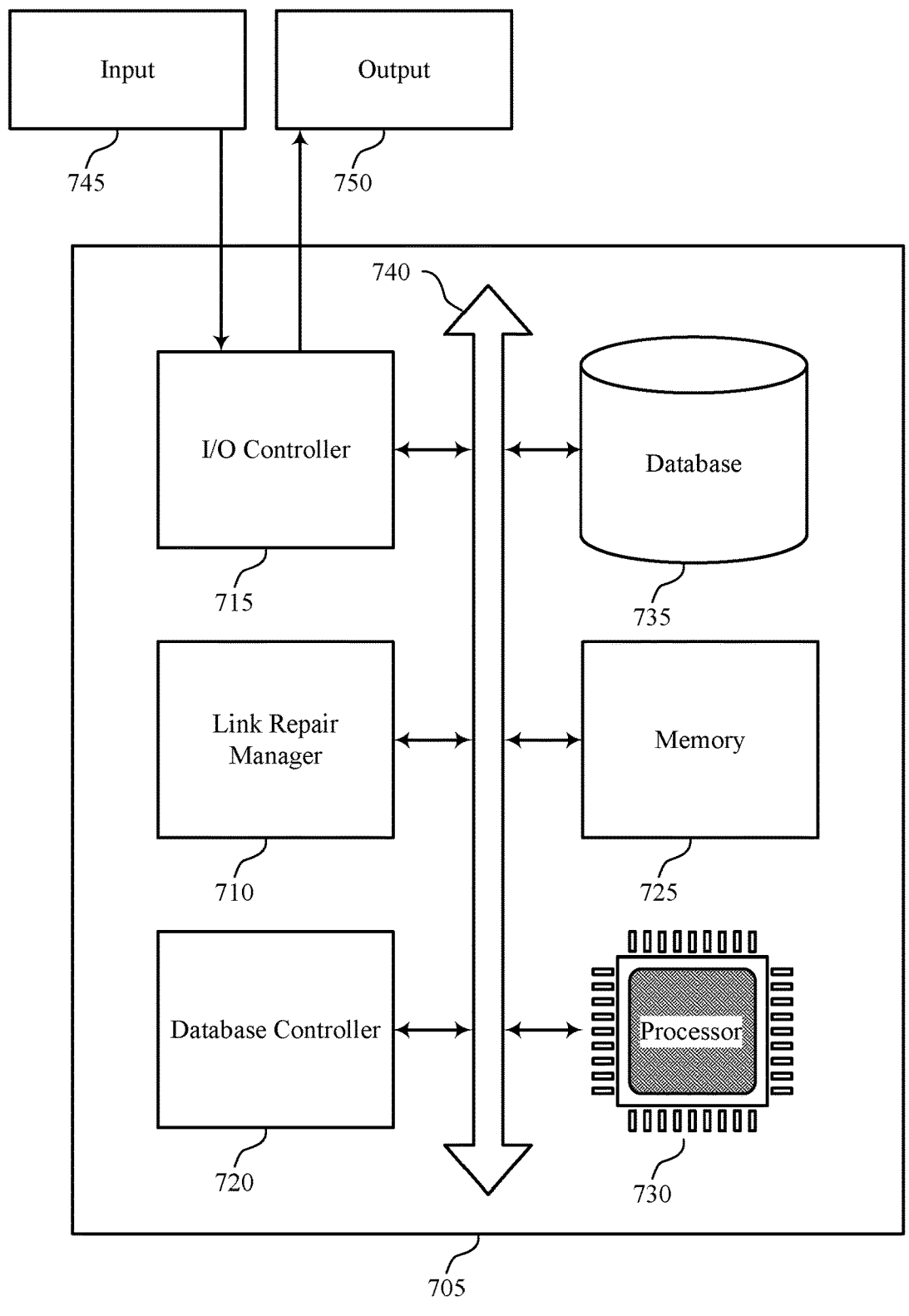
FIG. 7 shows a diagram of a system including a device that supports automated network link repair in accordance with aspects of the present disclosure.

FIG. 7 shows a diagram of a system 700 including a device 705 that supports automated network link repair in accordance with aspects of the present disclosure. The device 705 may be an example of or include the components of a database server or an apparatus 505 as described herein. The device 705 may include components for bi-directional data communications including components for transmitting and receiving communications, including a link repair manager 710, an I/O controller 715, a database controller 720, memory 725, a processor 730, and a database 735. These components may be in electronic communication via one or more buses (e.g., bus 740).

The link repair manager 710 may be an example of a link repair manager 515 or 605 as described herein. For example, the link repair manager 710 may perform any of the methods or processes described above with reference to FIGS. 5 and 6. In some cases, the link repair manager 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting automated network link repair).

Figure 8:
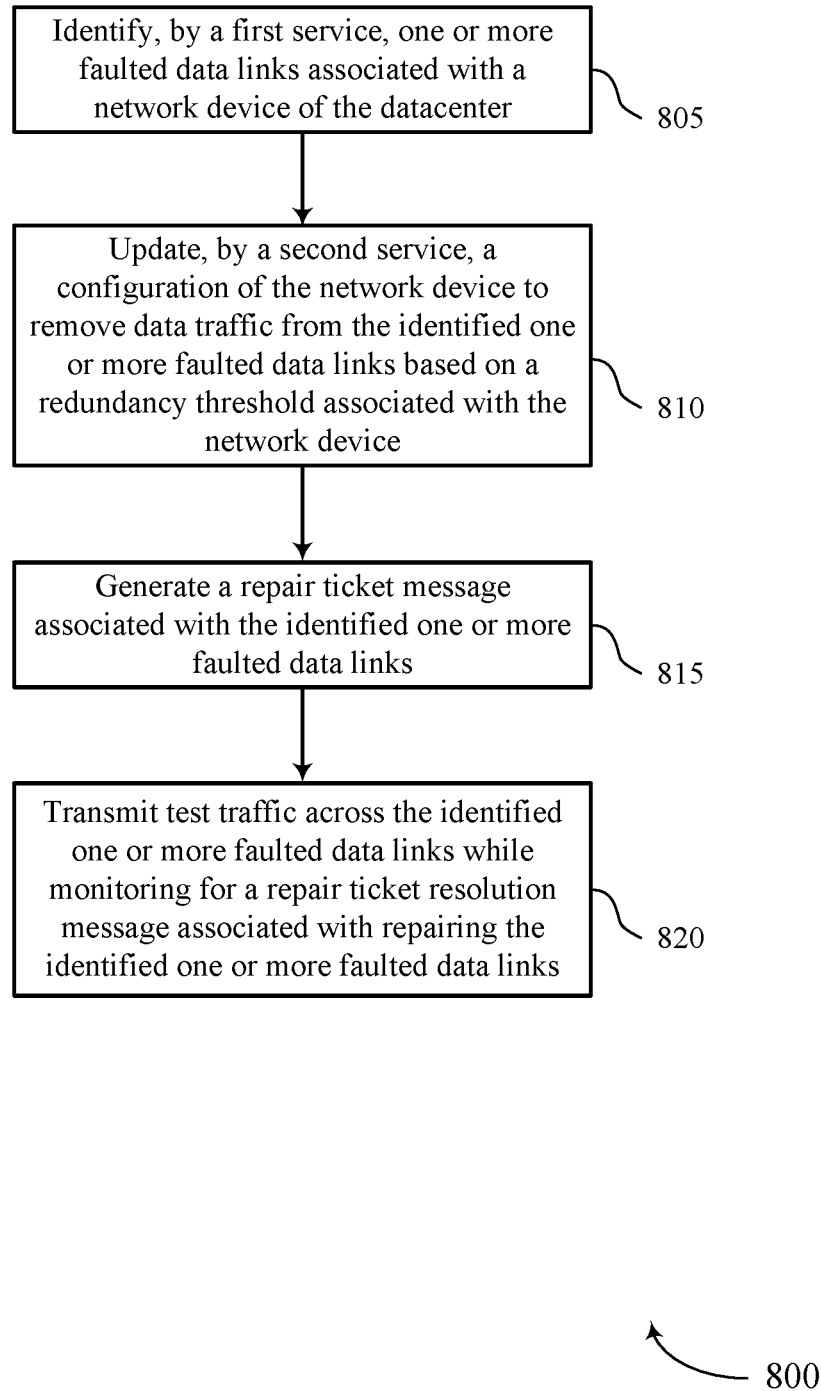
FIGS. 8 through 12 show flowcharts illustrating methods that support automated network link repair in accordance with aspects of the present disclosure.

FIG. 8 shows a flowchart illustrating a method 800 that supports automated network link repair in accordance with aspects of the present disclosure. The operations of method 800 may be implemented by a database server or its components as described herein. For example, the operations of method 800 may be performed by a link repair manager as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 805, the database server may identify, by a first service, one or more faulted data links associated with a network device of the datacenter. The operations of 805 may be performed according to the methods described herein. In some examples, aspects of the operations of 805 may be performed by a monitoring service component as described with reference to FIGS. 5 through 7.

At 810, the database server may update, by a second service, a configuration of the network device to remove data traffic from the identified one or more faulted data links based on a redundancy threshold associated with the network device. The operations of 810 may be performed according to the methods described herein. In some examples, aspects of the operations of 810 may be performed by a data traffic component as described with reference to FIGS. 5 through 7.

At 815, the database server may generate a repair ticket message associated with the identified one or more faulted data links. The operations of 815 may be performed according to the methods described herein. In some examples, aspects of the operations of 815 may be performed by a repair ticket component as described with reference to FIGS. 5 through 7.

At 820, the database server may transmit test traffic across the identified one or more faulted data links while monitoring for a repair ticket resolution. The operations of 820 may be performed according to the methods described herein. In some examples, aspects of the operations of 820 may be performed by a probing component as described with reference to FIGS. 5 through 7.

Figure 9:
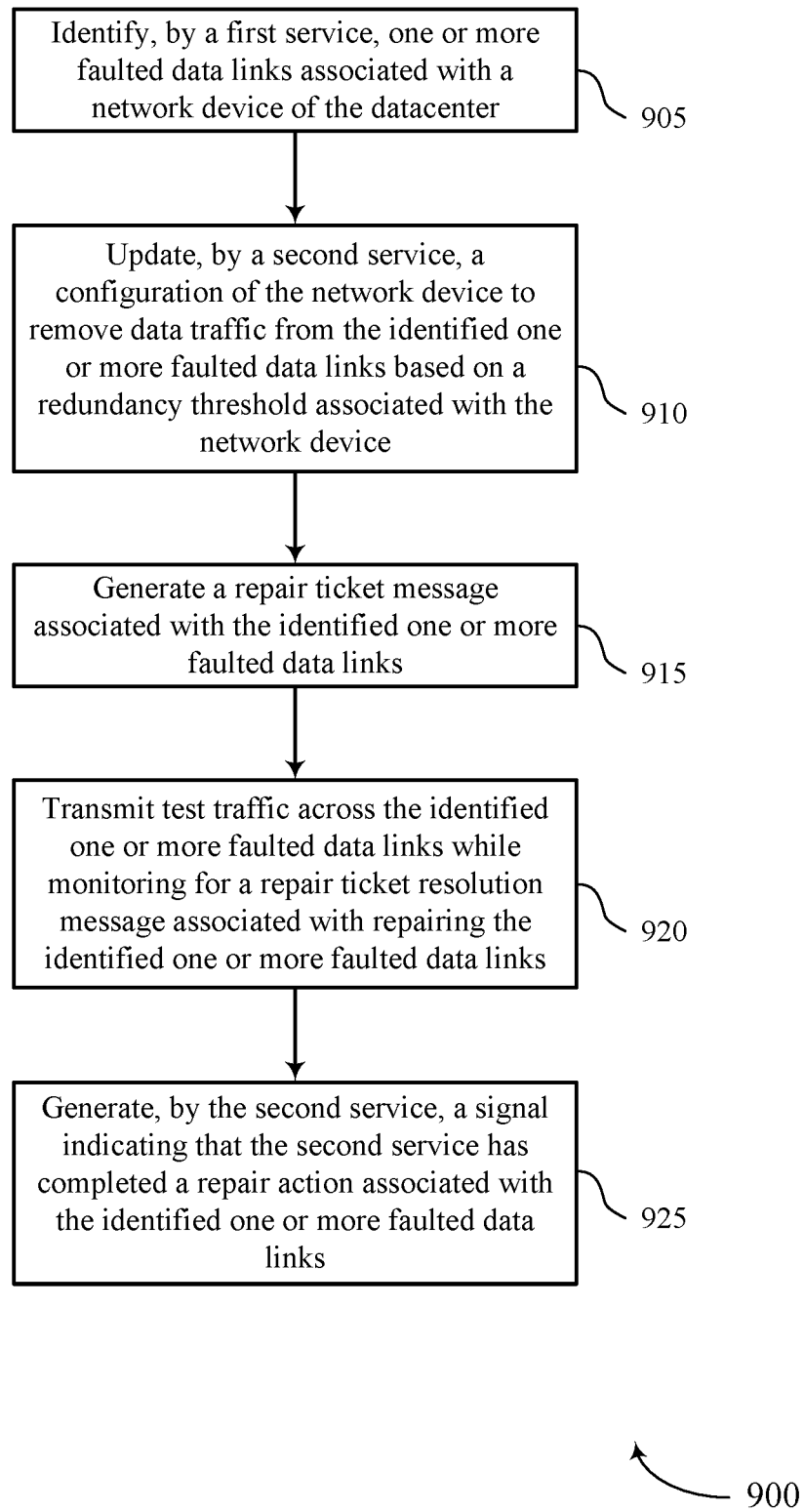

FIG. 9 shows a flowchart illustrating a method 900 that supports automated network link repair in accordance with aspects of the present disclosure. The operations of method 900 may be implemented by a database server or its components as described herein. For example, the operations of method 900 may be performed by a link repair manager as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 905, the database server may identify, by a first service, one or more faulted data links associated with a network device of the datacenter. The operations of 905 may be performed according to the methods described herein. In some examples, aspects of the operations of 905 may be performed by a monitoring service component as described with reference to FIGS. 5 through 7.

At 910, the database server may update, by a second service, a configuration of the network device to remove data traffic from the identified one or more faulted data links based on a redundancy threshold associated with the network device. The operations of 910 may be performed according to the methods described herein. In some examples, aspects of the operations of 910 may be performed by a data traffic component as described with reference to FIGS. 5 through 7.

At 915, the database server may generate a repair ticket message associated with the identified one or more faulted data links. The operations of 915 may be performed according to the methods described herein. In some examples, aspects of the operations of 915 may be performed by a repair ticket component as described with reference to FIGS. 5 through 7.

At 920, the database server may transmit test traffic across the identified one or more faulted data links while monitoring for a repair ticket resolution. The operations of 920 may be performed according to the methods described herein. In some examples, aspects of the operations of 920 may be performed by a probing component as described with reference to FIGS. 5 through 7.

At 925, the database server may generate, by the second service, a signal indicating that the second service has completed a repair action associated with the identified one or more faulted data links. The operations of 925 may be performed according to the methods described herein. In some examples, aspects of the operations of 925 may be performed by a data traffic component as described with reference to FIGS. 5 through 7.

Figure 10:
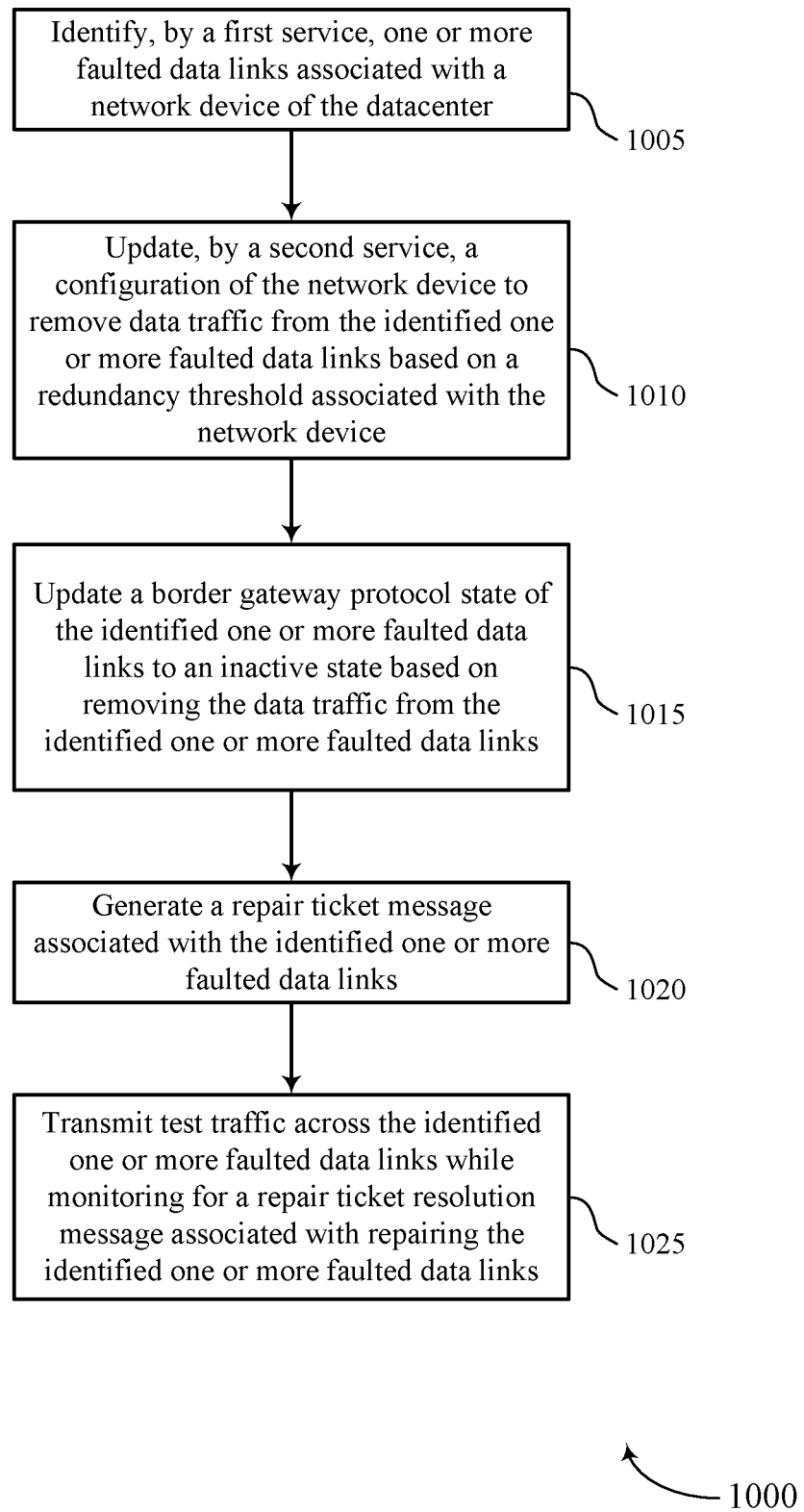

FIG. 10 shows a flowchart illustrating a method 1000 that supports automated network link repair in accordance with aspects of the present disclosure. The operations of method 1000 may be implemented by a database server or its components as described herein. For example, the operations of method 1000 may be performed by a link repair manager as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 1005, the database server may identify, by a first service, one or more faulted data links associated with a network device of the datacenter. The operations of 1005 may be performed according to the methods described herein. In some examples, aspects of the operations of 1005 may be performed by a monitoring service component as described with reference to FIGS. 5 through 7.

At 1010, the database server may update, by a second service, a configuration of the network device to remove data traffic from the identified one or more faulted data links based on a redundancy threshold associated with the network device. The operations of 1010 may be performed according to the methods described herein. In some examples, aspects of the operations of 1010 may be performed by a data traffic component as described with reference to FIGS. 5 through 7.

At 1015, the database server may update a border gateway protocol state of the identified one or more faulted data links to an inactive state based on removing the data traffic from the identified one or more faulted data links. The operations of 1015 may be performed according to the methods described herein. In some examples, aspects of the operations of 1015 may be performed by a data traffic component as described with reference to FIGS. 5 through 7.

At 1020, the database server may generate a repair ticket message associated with the identified one or more faulted data links. The operations of 1020 may be performed according to the methods described herein. In some examples, aspects of the operations of 1020 may be performed by a repair ticket component as described with reference to FIGS. 5 through 7.

At 1025, the database server may transmit test traffic across the identified one or more faulted data links while monitoring for a repair ticket resolution. The operations of 1025 may be performed according to the methods described herein. In some examples, aspects of the operations of 1025 may be performed by a probing component as described with reference to FIGS. 5 through 7.

Figure 11:
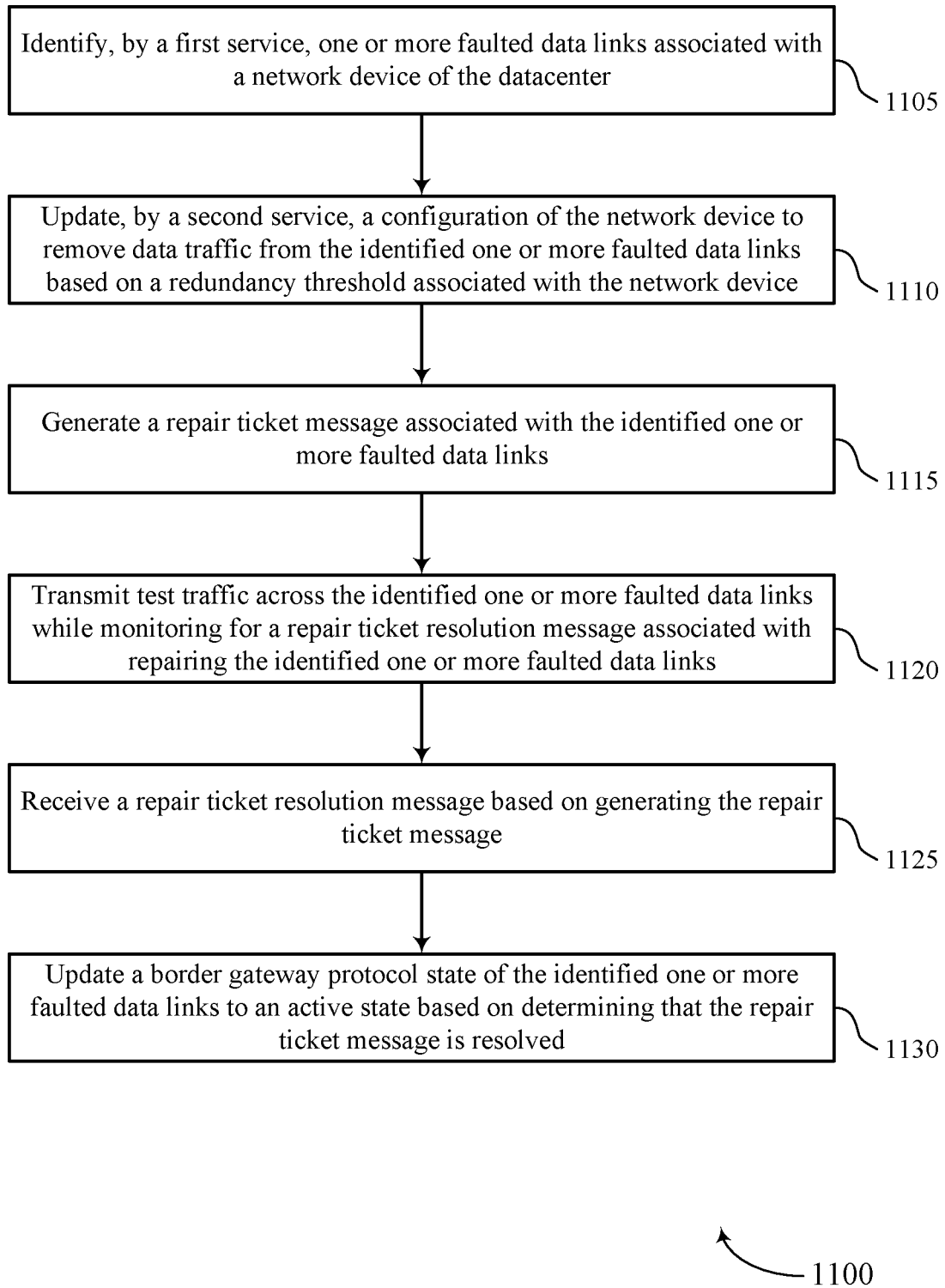

FIG. 11 shows a flowchart illustrating a method 1100 that supports automated network link repair in accordance with aspects of the present disclosure. The operations of method 1100 may be implemented by a database server or its components as described herein. For example, the operations of method 1100 may be performed by a link repair manager as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 1105, the database server may identify, by a first service, one or more faulted data links associated with a network device of the datacenter. The operations of 1105 may be performed according to the methods described herein. In some examples, aspects of the operations of 1105 may be performed by a monitoring service component as described with reference to FIGS. 5 through 7.

At 1110, the database server may update, by a second service, a configuration of the network device to remove data traffic from the identified one or more faulted data links based on a redundancy threshold associated with the network device. The operations of 1110 may be performed according to the methods described herein. In some examples, aspects of the operations of 1110 may be performed by a data traffic component as described with reference to FIGS. 5 through 7.

At 1115, the database server may generate a repair ticket message associated with the identified one or more faulted data links. The operations of 1115 may be performed according to the methods described herein. In some examples, aspects of the operations of 1115 may be performed by a repair ticket component as described with reference to FIGS. 5 through 7.

At 1120, the database server may transmit test traffic across the identified one or more faulted data links while monitoring for a repair ticket resolution. The operations of 1120 may be performed according to the methods described herein. In some examples, aspects of the operations of 1120 may be performed by a probing component as described with reference to FIGS. 5 through 7.

At 1125, the database server may receive a repair ticket resolution message based on generating the repair ticket message. In some cases, the repair ticket resolution message may be associated with a repair action associated with the identified one or more faulted data links. The operations of 1125 may be performed according to the methods described herein. In some examples, aspects of the operations of 1125 may be performed by a repair ticket component as described with reference to FIGS. 5 through 7.

At 1130, the database server may update a border gateway protocol state of the identified one or more faulted data links to an active state based on determining that the repair ticket message is resolved. The operations of 1130 may be performed according to the methods described herein. In some examples, aspects of the operations of 1130 may be performed by a data traffic component as described with reference to FIGS. 5 through 7.

Figure 12:
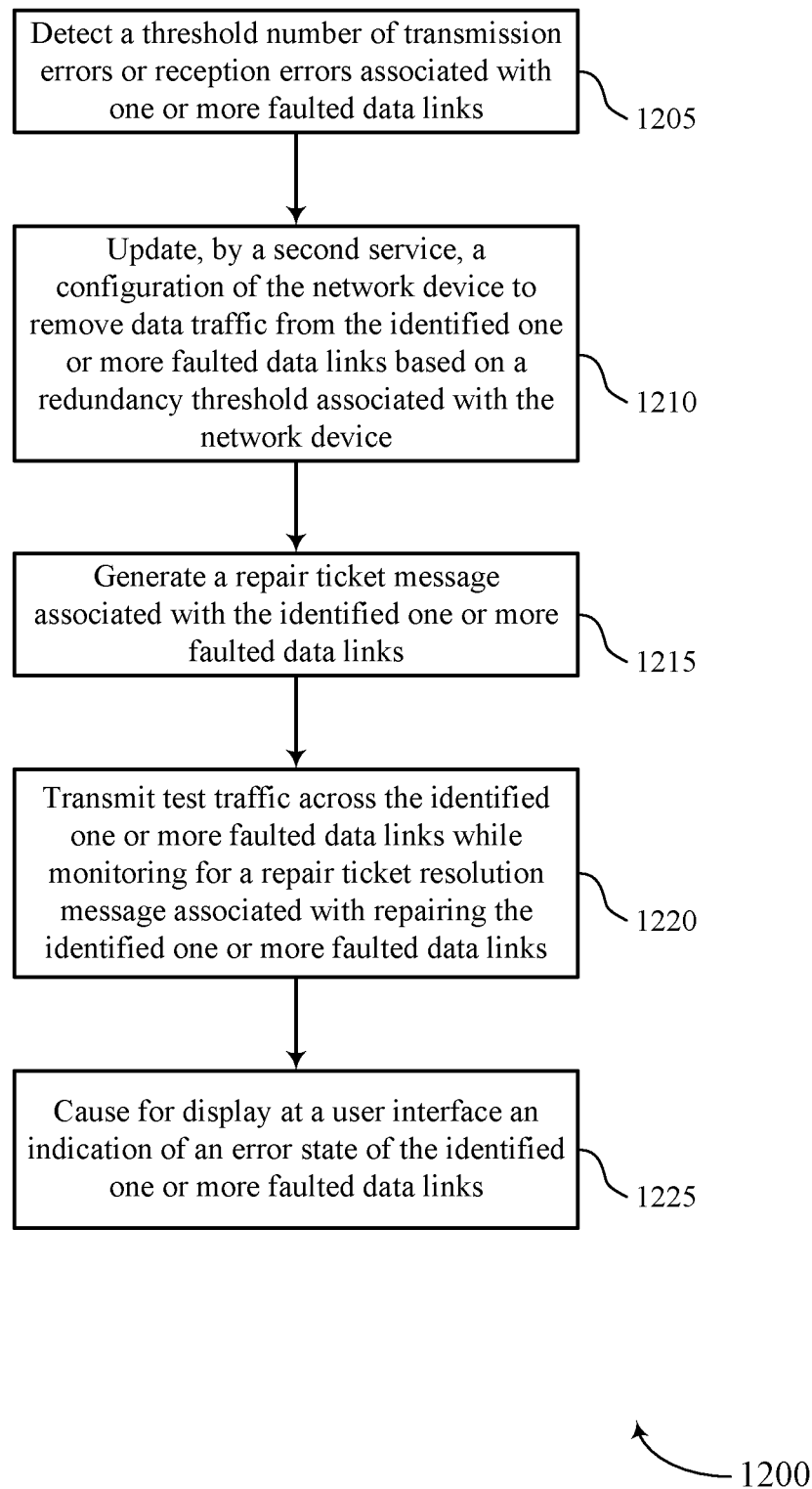

FIG. 12 shows a flowchart illustrating a method 1200 that supports automated network link repair in accordance with aspects of the present disclosure. The operations of method 1200 may be implemented by a database server or its components as described herein. For example, the operations of method 1200 may be performed by a link repair manager as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 1205, the database server may detect a threshold number of transmission errors or reception errors associated with one or more faulted data links. In some cases, identifying the one or more faulted data links may include detecting the threshold number of transmission errors or reception errors. The operations of 1205 may be performed according to the methods described herein. In some examples, aspects of the operations of 1205 may be performed by a data traffic component as described with reference to FIGS. 5 through 7.

At 1210, the database server may update, by a second service, a configuration of the network device to remove data traffic from the identified one or more faulted data links based on a redundancy threshold associated with the network device. The operations of 1210 may be performed according to the methods described herein. In some examples, aspects of the operations of 1210 may be performed by a data traffic component as described with reference to FIGS. 5 through 7.

At 1215, the database server may generate a repair ticket message associated with the identified one or more faulted data links. The operations of 1215 may be performed according to the methods described herein. In some examples, aspects of the operations of 1215 may be performed by a repair ticket component as described with reference to FIGS. 5 through 7.

At 1220, the database server may transmit test traffic across the identified one or more faulted data links while monitoring for a repair ticket resolution. The operations of 1220 may be performed according to the methods described herein. In some examples, aspects of the operations of 1220 may be performed by a probing component as described with reference to FIGS. 5 through 7.

At 1225, the database server may cause for display at a user interface an indication of an error state of the identified one or more faulted data links. The operations of 1225 may be performed according to the methods described herein. In some examples, aspects of the operations of 1225 may be performed by an user interface component as described with reference to FIGS. 5 through 7.

A method of data processing is described. The method may include identifying, by a first service, one or more faulted data links associated with a network device of the datacenter, updating, by a second service, a configuration of the network device to remove data traffic from the identified one or more faulted data links based on a redundancy threshold associated with the network device, generating a repair ticket message associated with the identified one or more faulted data links, and transmitting test traffic across the identified one or more faulted data links while monitoring for a repair ticket resolution message associated with repairing the identified one or more faulted data links.

An apparatus for data processing is described. The apparatus may include a processor, memory coupled with the processor, and instructions stored in the memory. The instructions may be executable by the processor to cause the apparatus to identify, by a first service, one or more faulted data links associated with a network device of the datacenter, update, by a second service, a configuration of the network device to remove data traffic from the identified one or more faulted data links based on a redundancy threshold associated with the network device, generate a repair ticket message associated with the identified one or more faulted data links, and transmit test traffic across the identified one or more faulted data links while monitoring for a repair ticket resolution message associated with repairing the identified one or more faulted data links.

Another apparatus for data processing is described. The apparatus may include means for identifying, by a first service, one or more faulted data links associated with a network device of the datacenter, means for updating, by a second service, a configuration of the network device to remove data traffic from the identified one or more faulted data links based on a redundancy threshold associated with the network device, means for generating a repair ticket message associated with the identified one or more faulted data links, and means for transmitting test traffic across the identified one or more faulted data links while monitoring for a repair ticket resolution message associated with repairing the identified one or more faulted data links.

A non-transitory computer-readable medium storing code for data processing is described. The code may include instructions executable by a processor to identify, by a first service, one or more faulted data links associated with a network device of the datacenter, update, by a second service, a configuration of the network device to remove data traffic from the identified one or more faulted data links based on a redundancy threshold associated with the network device, generate a repair ticket message associated with the identified one or more faulted data links, and transmit test traffic across the identified one or more faulted data links while monitoring for a repair ticket resolution message associated with repairing the identified one or more faulted data links.

Some examples of the method, apparatuses, and non-transitory computer-readable medium described herein may further include operations, features, means, or instructions for determining whether a number of the identified one or more faulted data links satisfies a configured threshold, and determining to update the configuration of the network device based on the number of the identified one or more faulted data links satisfying the configured threshold.

Some examples of the method, apparatuses, and non-transitory computer-readable medium described herein may further include operations, features, means, or instructions for identifying a defined action to take in response to the number of the identified one or more faulted data links satisfying the configured threshold.

Some examples of the method, apparatuses, and non-transitory computer-readable medium described herein may further include operations, features, means, or instructions for probing the identified one or more faulted data links to continuously forward the test traffic across the identified one or more faulted data links.

Some examples of the method, apparatuses, and non-transitory computer-readable medium described herein may further include operations, features, means, or instructions for implementing a feedback loop to generate feedback associated with repair actions for the identified one or more faulted data links based on probing the identified one or more faulted data links.

Some examples of the method, apparatuses, and non-transitory computer-readable medium described herein may further include operations, features, means, or instructions for updating a border gateway protocol state of the identified one or more faulted data links to an inactive state based on removing the data traffic from the identified one or more faulted data links.

Some examples of the method, apparatuses, and non-transitory computer-readable medium described herein may further include operations, features, means, or instructions for measuring a resolution time associated with repairing each of the identified one or more faulted data links.

Some examples of the method, apparatuses, and non-transitory computer-readable medium described herein may further include operations, features, means, or instructions for receiving a repair ticket resolution message based on generating the repair ticket message, where the repair ticket resolution message is associated with a repair action associated with the identified one or more faulted data links, determining that the repair ticket message is resolved based on receiving the repair ticket resolution message, and initiating an action to update a state identifier associated with the identified one or more faulted data links based on determining that the repair ticket message is resolved.

Some examples of the method, apparatuses, and non-transitory computer-readable medium described herein may further include operations, features, means, or instructions for updating a border gateway protocol state of the identified one or more faulted data links to an active state based on determining that the repair ticket message is resolved.

Some examples of the method, apparatuses, and non-transitory computer-readable medium described herein may further include operations, features, means, or instructions for rerouting the data traffic back to the one or more identified faulted data links based at least in part on receiving the repair ticket resolution message.

Some examples of the method, apparatuses, and non-transitory computer-readable medium described herein may further include operations, features, means, or instructions for generating, by the second service, a signal indicating that the second service has completed a repair action associated with the identified one or more faulted data links.

Some examples of the method, apparatuses, and non-transitory computer-readable medium described herein may further include operations, features, means, or instructions for causing for display at a user interface an indication of an error state of the identified one or more faulted data links.

Some examples of the method, apparatuses, and non-transitory computer-readable medium described herein may further include operations, features, means, or instructions for detecting a threshold number of transmission errors or reception errors associated with the one or more faulted data links.

In some examples of the method, apparatuses, and non-transitory computer-readable medium described herein, the first service includes an automatic monitoring service and the second service comprises an automated network repair agent.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at a datacenter, comprising:
    identifying, by a first service, one or more faulted data links associated with a network device of the datacenter;
    determining, by a second service, a redundancy threshold indicating a number of data links configured to remain operational during a time period;
    updating, by the second service, a configuration of the network device to remove data traffic from the identified one or more faulted data links based at least in part on the redundancy threshold associated with the network device;
    generating a repair ticket message associated with the identified one or more faulted data links; and transmitting test traffic across the identified one or more faulted data links while monitoring for a repair ticket resolution message associated with repairing the identified one or more faulted data links.

2. The method of claim 1, further comprising:
determining whether a number of the identified one or more faulted data links satisfies a configured threshold; and
determining to update the configuration of the network device based at least in part on the number of the identified one or more faulted data links satisfying the configured threshold.

3. The method of claim 2, further comprising:
identifying a defined action to take in response to the number of the identified one or more faulted data links satisfying the configured threshold.

4. The method of claim 1, wherein transmitting the test traffic across the identified one or more faulted data links comprises:
probing the identified one or more faulted data links to continuously forward the test traffic across the identified one or more faulted data links.

5. The method of claim 4, further comprising:
implementing a feedback loop to generate feedback associated with repair actions for the identified one or more faulted data links based at least in part on probing the identified one or more faulted data links.

6. The method of claim 1, further comprising:
updating a border gateway protocol state of the identified one or more faulted data links to an inactive state based at least in part on removing the data traffic from the identified one or more faulted data links.

7. The method of claim 1, further comprising:
measuring a resolution time associated with repairing each of the identified one or more faulted data links.

8. The method of claim 1, further comprising:
receiving a repair ticket resolution message based at least in part on generating the repair ticket message, wherein the repair ticket resolution message is associated with a repair action associated with the identified one or more faulted data links;
determining that the repair ticket message is resolved based at least in part on receiving the repair ticket resolution message; and
initiating an action to update a state identifier associated with the identified one or more faulted data links based at least in part on determining that the repair ticket message is resolved.

9. The method of claim 8, wherein initiating the action to update the state identifier comprises:
updating a border gateway protocol state of the identified one or more faulted data links to an active state based at least in part on determining that the repair ticket message is resolved.

10. The method of claim 8, further comprising:
rerouting the data traffic back to the one or more identified faulted data links based at least in part on receiving the repair ticket resolution messages.

11. The method of claim 1, further comprising:
generating, by the second service, a signal indicating that the second service has completed a repair action associated with the identified one or more faulted data links.

12. The method of claim 1, further comprising:
causing for display at a user interface an indication of an error state of the identified one or more faulted data links.

13. The method of claim 1, wherein identifying the one or more faulted data links comprises:
detecting a threshold number of transmission errors or reception errors associated with the one or more faulted data links.

14. The method of claim 1, wherein the first service comprises an automatic monitoring service and the second service comprises an automated network repair agent.

15. An apparatus for data processing, comprising:
a processor,
memory coupled with the processor; and
instructions stored in the memory and executable by the processor to cause the apparatus to:
identify, by a first service, one or more faulted data links associated with a network device of the datacenter;
determine, by a second service, a redundancy threshold indicating a number of data links configured to remain operational during a time period;
update, by the second service, a configuration of the network device to remove data traffic from the identified one or more faulted data links based at least in part on the redundancy threshold associated with the network device;
generate a repair ticket message associated with the identified one or more faulted data links; and
transmit test traffic across the identified one or more faulted data links while monitoring for a repair ticket resolution message associated with repairing the identified one or more faulted data links.

16. The apparatus of claim 15, wherein the instructions are further executable by the processor to cause the apparatus to:
determine whether a number of the identified one or more faulted data links satisfies a configured threshold; and
determine to update the configuration of the network device based at least in part on the number of the identified one or more faulted data links satisfying the configured threshold.

17. The apparatus of claim 16, wherein the instructions are further executable by the processor to cause the apparatus to:
identify a defined action to take in response to the number of the identified one or more faulted data links satisfying the configured threshold.

18. The apparatus of claim 15, wherein the instructions to transmit the test traffic across the identified one or more faulted data links are further executable by the processor to cause the apparatus to:
probe the identified one or more faulted data links to continuously forward the test traffic across the identified one or more faulted data links.

19. The apparatus of claim 18, wherein the instructions are further executable by the processor to cause the apparatus to:
implement a feedback loop to generate feedback associated with repair actions for the identified one or more faulted data links based at least in part on probing the identified one or more faulted data links.

20. A non-transitory computer-readable medium storing code for data processing, the code comprising instructions executable by a processor to:
identify, by a first service, one or more faulted data links associated with a network device of the datacenter;
determine, by a second service, a redundancy threshold indicating a number of data links configured to remain operational during a time period;

update, by the second service, a configuration of the network device to remove data traffic from the identified one or more faulted data links based at least in part on the redundancy threshold associated with the network device;
generate a repair ticket message associated with the identified one or more faulted data links; and
transmit test traffic across the identified one or more faulted data links while monitoring for a repair ticket resolution message associated with repairing the identified one or more faulted data links.

* * * * *